G. G. FLOYD.
APPARATUS FOR MANUFACTURING GAS AND LIME.
APPLICATION FILED JAN. 11, 1909.
997,982.
Patented July 18, 1911.
3 SHEETS—SHEET 1.
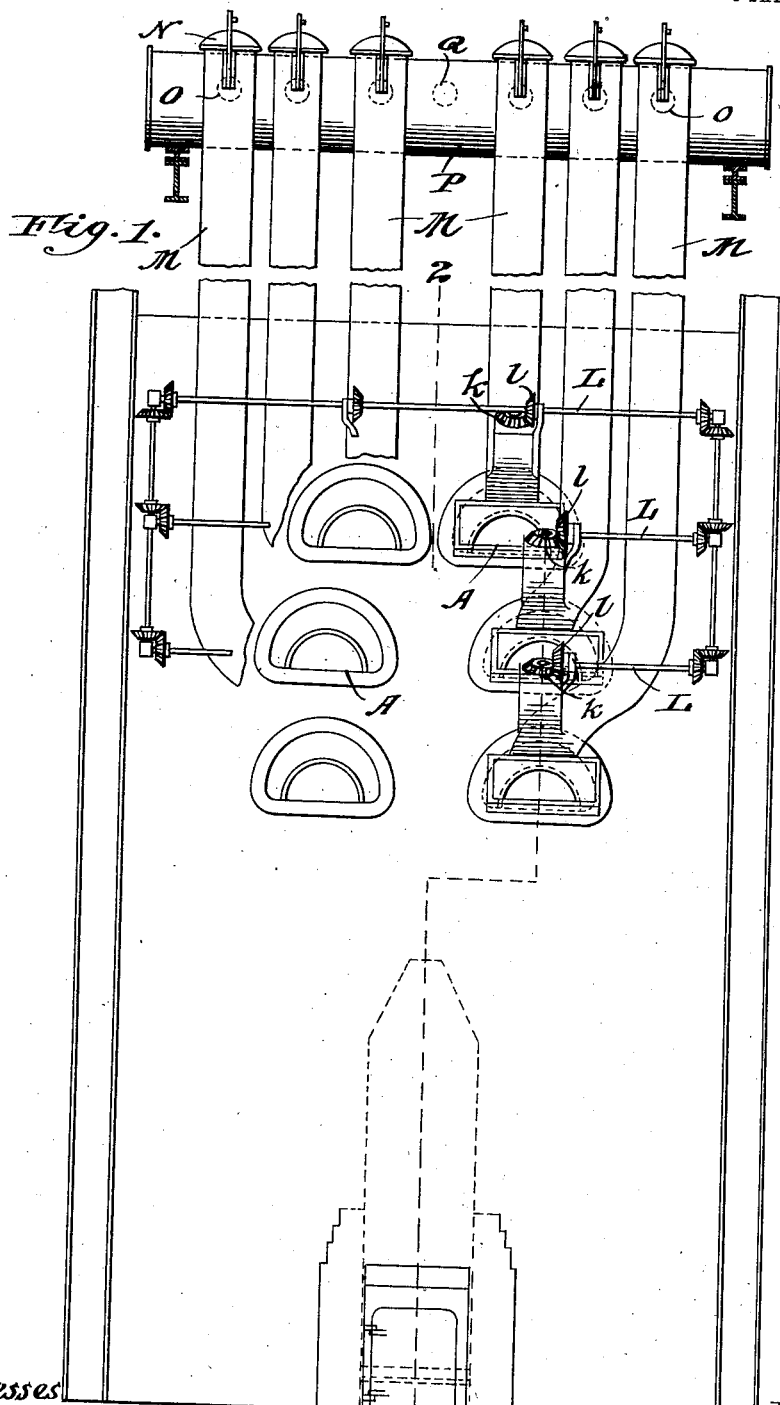

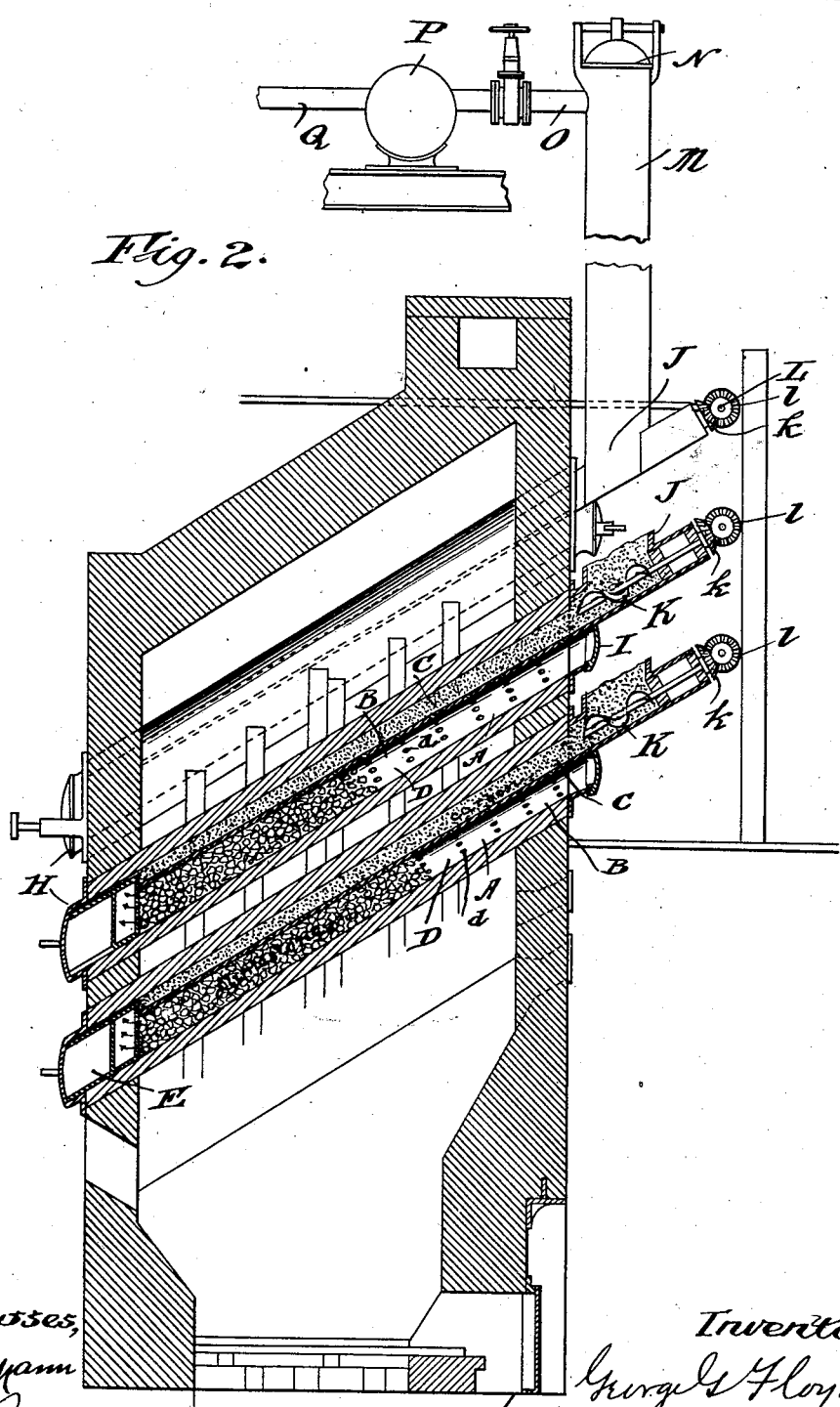

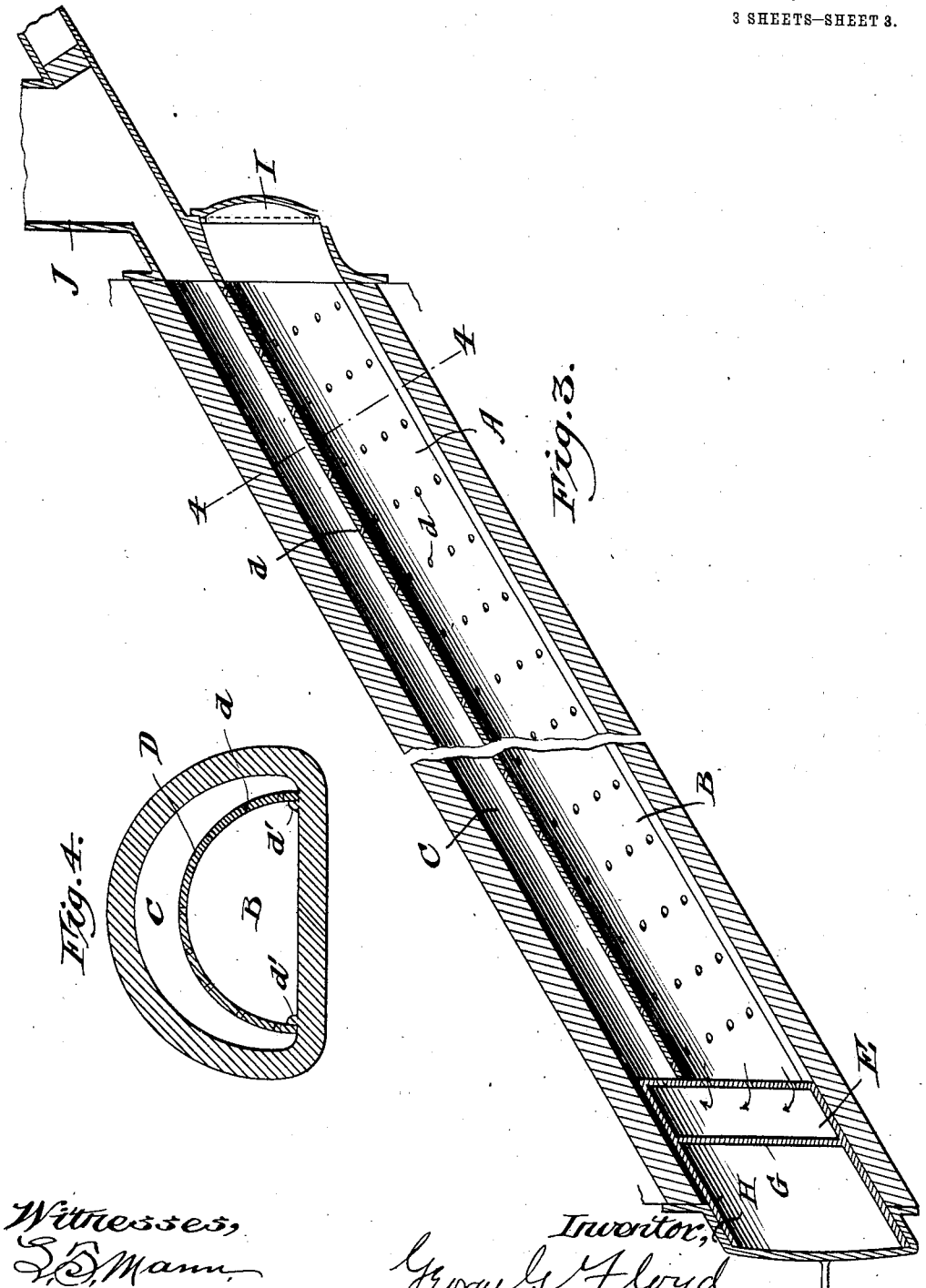

UNITED STATES PATENT OFFICE.

GEORGE G. FLOYD, OF KIRKWOOD, MISSOURI.

APPARATUS FOR MANUFACTURING GAS AND LIME.

997,982.  Specification of Letters Patent.  Patented July 18, 1911.

Application filed January 11, 1909. Serial No. 471,634.

*To all whom it may concern:*

Be it known that I, GEORGE G. FLOYD, a citizen of the United States, residing at Kirkwood, in the county of St. Louis, State of Missouri, have invented certain new and useful Improvements in Apparatus for Manufacturing Gas and Lime, of which the following is a specification.

The object of my invention is to provide an apparatus for carrying out an economical method for the simultaneous production of quick lime and carbon monoxid gas from mineral carbonate, such as limestone, and organic substances, such as charcoal or coke, the operation being conducted in retorts preferably arranged in series and having air-tight connections.

When limestone is heated it evolves carbon dioxid according to the reaction expressed by the formula $$CaCO_3 + heat = CaO + CO_2,$$

and as heated carbon reduces carbon dioxid to carbon monoxid, the equation for the change being $CO_2 + C = 2CO$, it has been proposed to charge into a closed vessel or air-tight retort a close mixture of broken limestone and charcoal or coke, place the retort under a sufficient heat to decompose the mixture, and remove the gas from the retort with an exhauster as it is evolved from the decomposing mixture.

As theoretically it requires approximately 12 lbs. of carbon to reduce the carbon dioxid from 100 lbs. of limestone to carbon monoxid, it is further proposed that the mixture shall be in such proportions that the carbon in the charcoal will be equal to about ten to twelve per cent., by weight, of the limestone.

When the carbonaceous material is mixed with the limestone, ash will be left in the lime, and for many purposes this will be a serious objection, as it lowers the grade of the lime. Limestone commences to decompose and evolve $CO_2$ gas at a temperature materially below the temperature at which glowing or incandescent carbon will reduce $CO_2$ gas to CO gas. Now, when it is attempted to produce CO gas from a mixture such as above described, it is necessary to charge such mixture into the retort at a temperature below that required to effect decomposition. In the interval between the decomposing temperature of limestone and the $CO_2$ reducing temperature of glowing carbon, gas will be evolved by the decomposition of the limestone, but will not be reduced, and must either be allowed to escape into the atmosphere and be lost, or, if allowed to pass to the receiver will dilute the gas therein. It should be noted further that in converting carbon dioxid into carbon monoxid gas by the agency of heated charcoal or coke (in accordance with the reaction $CO_2 + C + heat = 2CO$) each molecule of the $CO_2$ gas must come into intimate contact with the heated carbon and maintain such relation for a sufficient interval of time to effect the reduction. Now, considering the small available heated area of the charcoal to the unit amount of gas evolved from the limestone in a mixture of the proportions above indicated, and the known fact that in the reduction of $CO_2$ gas to CO gas it is necessary to expose a definite area of glowing carbon to a definite volume of the $CO_2$ gas, it is apparent that a certain percentage of the $CO_2$ gas may not come into such intimate contact with the heated charcoal as to effect the desired complete conversion. It is obvious, therefore, that a mere mechanical mixture of limestone and carbonaceous material may not present such definite relations of the material as to accomplish the desired result. Again, at a certain constant temperature and pressure, $CO_2$ gas will be evolved from limestone in a relatively-constant volume, but as the process continues the $CO_2$ gas consumes the carbon, and, its relative bulk becoming smaller, its effective area presented for the reduction of the $CO_2$ gas is correspondingly diminished, and the percentage of $CO_2$ gas unreduced will be in an increasing ratio as the decomposition of the limestone proceeds. Therefore, the gas evolved during the latter stage of the process where a mixture of the character specified is used will contain a larger percentage of $CO_2$ gas than at the beginning of the process.

When calcium carbonate is heated in a closed vessel it gives off carbon dioxid until a certain pressure of this gas is reached, after which no further change occurs until the conditions are in some way altered. To every temperature there is a corresponding pressure of carbon dioxid which is perfectly definite and constant. When equilibrium is reached at any particular temperature and its corresponding pressure, the calcium carbonate is being decomposed into lime and carbon dioxid at exactly the same rate as the lime and carbon dioxid are recombining to form calcium carbonate. In order, therefore, to completely decompose calcium carbonate by heat, it is necessary to keep the pressure of the carbon dioxid as low as possible and the temperature as high as possible. The time and consequently the economy of decomposing limestone in a closed vessel or retort depends, therefore, upon the work carried on with the $CO_2$ pressure below or at a temperature above that which would establish an equilibrium.

In decomposing a mixture of mineral carbonate and carbonaceous material in a retort closed to the outside air at a constant temperature, and removing the gas as evolved or given off, I found that the time required in so doing was proportional to the $CO_2$ pressure in the retort. The lower the $CO_2$ pressure can be brought below the critical $CO_2$ pressure that would establish an equilibrium at a temperature which it is practical to maintain, the greater the economy in decomposing the calcium carbonate.

To sum up, I found that with a mechanical mixture of mineral carbonate and carbonaceous material it was impossible to reduce entirely all of the $CO_2$ gas as it was evolved, even at the beginning of a fresh charge, and consequently that a certain $CO_2$ pressure was set up and the speed of decomposition was in proportion to the ratio the $CO_2$ pressure thus set up bore to the critical pressure corresponding to the temperature of the retort, and as the bulk of the glowing charcoal decreased and the $CO_2$ pressure increased, the time of decomposition slowed up, the ratio of decrease being progressive as the operation continued, and the quantity of gas evolved decreasing of course correspondingly. The length of time necessary to the working of the process under these conditions renders the operation more expensive, and in addition thereto it was found practically impossible to completely calcine the lime rock.

The object of my present invention is the production of an apparatus whereby to secure the rapid and economical production of fuel gas from mineral carbonate, such as limestone, and carbonaceous material, such as charcoal or coke, in such manner that a CO gas practically pure and a thoroughly calcined quick-lime free from ash or other impurities are obtained. I have discovered that it is possible to accomplish these objects more perfectly by using an apparatus which separates the carbonaceous material from the mineral carbonate during the carrying out of the process, and this I may accomplish by superposing the former upon the latter and passing the carbon dioxid gas through the incandescent mass of carbonaceous material. This may be accomplished by providing a retort with a diaphragm or partition whereby it is divided into two chambers, in one of which the mineral carbonates are contained, the other being charged with carbonaceous material, the partition being perforated so that the carbon dioxid gas may pass freely as it is evolved into the glowing mass of carbonaceous material.

My invention in its broader aspects comprises an apparatus or device whereby to secure a disposition of the materials with reference to each other and such a mode of treatment thereof that the $CO_2$ gas evolved by the decomposition of the limestone will be reduced as formed, thereby avoiding such increased $CO_2$ pressure as would retard the decomposition of the limestone, while by the physical separation of the ingredients intermixture of the residuum or ash with the quick lime is obviated.

The novel apparatus forming a preferred embodiment of my invention consists essentially in a new construction of the retort, whereby the materials may be kept separate and whereby also the carbonaceous material may be maintained at practically reducing temperature, the ash therefrom being prevented from mixing with the lime, and the sensible heat of the $CO_2$ gas product being utilized to maintain the carbonaceous material at a high temperature.

I will now describe a form of apparatus which is well adapted to the carrying out of my improved process, as will be hereinafter pointed out. Such apparatus is shown in the accompanying drawings, in which—

Figure 1 is an elevation with parts broken away; Fig. 2 is a vertical sectional elevation on line 2—2 of Fig. 1; and Figs. 3 and 4 are, respectively, a longitudinal and a transverse sectional elevation through one of the retorts.

The apparatus shown in the drawings comprises a series of retorts A, six being the usual number employed in a battery. Each of these retorts is substantially semi-cylindrical in cross-section, the interior thereof being further sub-divided into two longitudinal chambers B and C by means of a longitudinal curved diaphragm or partition D provided with a series of minute perforations or apertures $d$. Each of such perforations preferably has an inclination toward the charging end of the apparatus, as is clearly indicated in Fig. 3. This partition D may be made of fire clay and is desirably loosely confined at its lower edges by means of lugs $d'$ on the bottom wall of the retort so as to allow for any warping of the diaphragm without danger of breakage. The lower end of each retort is closed by a suitably-shaped removably-inserted casting E having two cross-walls G, the former being perforated to establish communication between the two chambers B and C.

H represents a removable cover which holds the parts E in place and by the removal of which said part can be taken out and the retort emptied. The chambers B and C are not of uniform diameter from end to end, the chamber B having a slight flare toward its lower end and the chamber C being slightly contracted toward its corresponding end. The upper end of the chamber B has a removable and detachable cover plate I, and the upper end of the chamber C communicates with a hopper J. A feed screw or conveyer K is mounted to operate within said hopper, and said feed screw is provided with a bevel gear $k$ which meshes with corresponding gears $l$ on the drive shaft L, these drive shafts, as shown in Fig. 1, extending across the battery of retorts, there being one for each pair, and the several driving shafts are intergeared so that they may all be driven simultaneously and from a single driver. Each of the hoppers communicates by a feed pipe M, which has a cover N for its upper end, and a pipe O, provided with a suitable valve, with a header P having an outlet pipe Q.

The chambers or compartments B of the retorts will be charged in any convenient manner with lime rock broken to suitable size, the cover plates I having been temporarily removed and the chambers C will be supplied with broken or pulverized charcoal, this material being fed into the pipes M so as to constitute a store or supply from which the screws K will continuously draw to keep these chambers or compartments completely filled. The furnace being charged with fuel, the flame thereof will pass upwardly around the retorts, and when the proper temperature is obtained the decomposition of the limestone will begin. The $CO_2$ gas evolved therefrom passes through the apertures $d$ into and through the body of charcoal in the chambers C and thence upwardly through the hopper, the body of charcoal in the pipes M, and through the pipe O to the header or reservoir P. The result of this operation is that the limestone is decomposed and the $CO_2$ gas passes through the highly heated carbon and is converted or reduced thereby into CO gas, and this case while hot passes through the mass of charcoal in the feed pipes M, thus imparting its heat to the charcoal and preliminarily fitting it to be charged into the retort, and at the same time thoroughly filtering the gas through the charcoal mass. The gas in the uptake pipes will have a temperature of approximately one-third to one-half the temperature to which the carbonaceous material must be raised to accomplish the reduction of the carbon dioxid to carbon monoxid. I, therefore, preferably make the combined uptake and feed pipes of considerable length and of such area that the gas will give up practically all of its sensible heat to the carbonaceous material on its way from the retort, and an economy is thus effected equal to the heat units necessary to be consumed in raising the temperature of the carbonaceous material to the degree attained by absorption from the gas. I prefer to connect each of the retorts independently to the header or reservoir P and to provide each with its own supply pipe, and it will be noted that after the retorts are heated up there will be maintained continuously a mass of heated carbonaceous material in the chamber C, and the ash will be constantly forced into the lower end of the chamber and can be removed when the retort is opened for the removal of the lime.

By means of this novel form of apparatus the gas evolved from the limestone of necessity passes through the bed or layer of glowing carbonaceous material, while the ash from the same material is prevented from mingling with the lime, which would not only retard the operation of producing gas, but would also introduce an impurity or adulterant into the lime itself. During this operation there is always present such an amount of carbon as to reduce the $CO_2$ gas as evolved or driven off with the result that all of such gas is reduced to CO gas before it leaves the retort.

While I prefer the form and arrangement of apparatus described and shown, it will be understood that such device may be varied in construction without departing from the scope of the invention, and that the several novel features herein described need not be used conjointly. The general requirement of such an apparatus to conform to the scope of my invention is that it shall permit of the physical separation of the carbonaceous material from the limestone, but this can be accomplished in a retort of different construction and arrangement than herein described. Again, in order to effect a saving in the operation I have shown a specific means for utilizing the heat of the gas as it leaves the retort to initially heat the carbonaceous material, but the specific means by which this is accomplished may be widely varied.

From the foregoing specification it will be apparent that the carbon dioxid gas expands at once into the space filled with the incandescent or glowing carbonaceous material, and this material is of sufficient bulk or quantity to at once convert or reduce all of the $CO_2$ to CO gas, the decomposition proceeding at an even rate and without the formation of silicates or aluminates in the lime or the mingling of ash therewith.

It will further be observed that with an apparatus of this character the retort will be hot when a fresh charge of limestone is put in, and gas will begin to be evolved therefrom when the calcining temperature is reached, such gas passing immediately into and through the glowing carbonaceous material, whereby it is converted into CO gas, and this in turn is passed directly into and through the incoming carbonaceous material which is being constantly fed into the retort, thus effecting the preliminary heating of such carbonaceous material which reaches the retort at such temperature that it will immediately glow.

By the employment of an apparatus of the character described above the operation is rendered practically continuous, no interruption being required except for the removal of the lime and the charging of the lime rock, and this may be effected without allowing the retort to cool. Furthermore, the ash of the carbonaceous material is prevented from mixing with the lime, and by the physical separation of the materials the pressure within the retort is CO pressure only and does not interfere with or retard the evolution of the $CO_2$ gas from the limestone. Furthermore, the absence of $CO_2$ pressure in the retorts makes it possible to carry on the process economically with a lower vacuum in the retorts enabling the CO gas to be withdrawn without drawing air into the system, thus resulting in a purer gas and greater economy.

I claim:

1. In an apparatus of the kind described, a retort of oval cross-section having a longitudinal partition of curved cross-section whereby to divide the working space of said retort into two chambers to contain a mineral carbonate and a carbonaceous material, respectively, removable closures for the mineral carbonate chamber, and means for constantly feeding or charging said carbonaceous material into the other of said chambers, substantially as described.

2. In an apparatus of the kind described, the combination of a series of retorts each arranged in an inclined position whereby their contents may be discharged by gravity, each of said retorts having a longitudinal perforated partition dividing the working space of said retort into parallel communicating chambers for mineral carbonate and carbonaceous material, respectively, pipes communicating with the upper ends of the carbonaceous material chambers and adapted to contain a supply of said material, substantially as described.

3. A retort having its working space divided into two communicating chambers by means of a longitudinal perforated partition arranged out of parallelism with the axis of the retort whereby to provide chambers of unequal cross-section in different portions thereof, substantially as described.

4. An inclined retort having its working space divided by a longitudinally-arranged perforated partition, said perforations being inclined from the elevated end of the retort, substantially as described.

5. An inclined retort having its working space divided by a longitudinally-arranged curved and perforated partition, said perforations being inclined from the elevated end of the retort, substantially as described.

GEORGE G. FLOYD.

Witnesses:
JOHN A. LAMONT,
E. B. SHEIZER.